United States Patent [19]  [11] 4,323,372
Bentz et al.  [45] Apr. 6, 1982

[54] PROCESS FOR RECOVERING NITROBENZENE, DICHLOROBENZENE AND/OR TRICHLOROBENZENE FROM EXHAUST GASES, IN PARTICULAR SPENT AIR

[75] Inventors: Rolf Bentz, Basel; Volker Fattinger, Arlesheim, both of Switzerland

[73] Assignee: Ciba-Geigy Corporation, Ardsley, N.Y.

[21] Appl. No.: 214,827

[22] Filed: Dec. 10, 1980

[30] Foreign Application Priority Data

Dec. 17, 1979 [CH] Switzerland ............... 11160/79

[51] Int. Cl.³ .......................................... B01D 53/04
[52] U.S. Cl. ............................................ 55/59; 55/68; 55/71; 55/74; 585/826
[58] Field of Search ............... 55/59, 61, 68, 71, 74; 585/800, 820, 826

[56] References Cited

U.S. PATENT DOCUMENTS

| 1,595,683 | 8/1926 | Burrell et al. | 55/59 |
| 1,742,247 | 1/1930 | Godel | 55/59 |
| 1,822,372 | 9/1931 | Putnam | 55/71 X |
| 1,997,145 | 4/1935 | Herbert | 55/59 |
| 2,449,402 | 9/1948 | Lipkin et al. | 55/74 X |
| 2,676,999 | 4/1954 | Schwenke | 55/74 X |
| 2,782,869 | 2/1957 | Gray | 55/74 |
| 3,005,826 | 10/1961 | Fleck et al. | 585/826 X |
| 3,140,244 | 7/1964 | Simek et al. | 55/71 X |
| 3,161,489 | 12/1964 | Dwyer et al. | 55/35 |
| 3,274,755 | 9/1966 | Montagnon et al. | 55/59 X |
| 3,283,025 | 11/1966 | Lenz et al. | 55/74 |
| 3,455,089 | 7/1969 | Mattia | 55/74 X |

FOREIGN PATENT DOCUMENTS

| 554209 | 6/1932 | Fed. Rep. of Germany . |
| 2013519 | 8/1979 | United Kingdom . |
| 1573349 | 8/1980 | United Kingdom . |

*Primary Examiner*—Robert H. Spitzer
*Attorney, Agent, or Firm*—Harry Falber

[57] ABSTRACT

A process for recovering nitrobenzene, dichlorobenzene and/or trichlorobenzene from substantially undried exhaust gases or spent air containing these compounds, by passing said gases through a layer of silica-containing adsorbents and, after adsorption, regenerating the adsorbents by removing the sorbed compounds. The relative humidity of the waste vapors is preferably less than 50% in order to achieve an effective separation by adsorption.

11 Claims, No Drawings

PROCESS FOR RECOVERING NITROBENZENE, DICHLOROBENZENE AND/OR TRICHLOROBENZENE FROM EXHAUST GASES, IN PARTICULAR SPENT AIR

The present invention relates to a process for recovering nitrobenzene, dichlorobenzene and/or trichlorobenzene from substantially undried exhaust gases or spent air by means of adsorption on silica gel, and to the use of silica gel for adsorbing nitrobenzene, dichlorobenzene and/or dichlorobenzene.

Industrial waste gases, spent air from air-conditioning plants in chemical or medical laboratories, or also in dry cleaning establishments, frequently contain more or less large amounts of organic solvent vapours. The uncontrolled release of these vapours into the atmosphere gives rise, on the one hand, to serious ecological problems, and, on the other, the possible loss of large amounts of solvent is a matter of economic importance. It is therefore increasingly necessary to retain the solvent vapours contained in the exhaust air and to recycle them for reuse.

In known methods, the exhaust air is usually passed over a solid adsorbent which, in the prior art processes, consisted almost exclusively of activated carbon. Reference is made in this connection to German Offenlegungsschrift Nos. 2 735 568 and 2 901 894. In spite of the wide use of activated carbon, it also has a number of disadvantages. On the one hand, plant safety is not guaranteed if the activated carbon is saturated with organic solvents (which often have a very low flash point). On the other hand, the ratio of maximum saturation of the activated carbon to the residual amount of solvent after regeneration of the adsorbent is not ideal.

German Pat. No. 554 209 describes a process for the separate recovery of vapours and gases from humid gaseous mixtures of hydrocarbons by separate adsorption in combinations of hydrophilic and hydrophobic adsorbents or those of different porosity, and by separate regeneration of the adsorbent. The preferred hydrophilic adsorbent is silica gel. A similar process is described in German Auslegeschrift No. 1 296 723, wherein water, propane and heavier hydrocarbons are isolated from a stream of earth gas by passing this latter through an oxidic, preferably silica-containing, adsorbent. In both processes, the isolated substances are non-polar organic compounds which are recovered from a gas or vapour mixture by adsorption on preferably silica-containing adsorbents, whereas the isolation of polar organic compounds, among which are nitrobenzene, dichlorobenzene and/or trichlorobenzene, from exhaust gases, is usually carried out using activated carbon as adsorbent.

It has now been found that silica-containing compounds, especially silica gel, is most suitable for the adsorption of polar organic compounds, namely dichlorobenzene and/or trichlorobenzene and, in particular, nitrobenzene, contained in most humid exhaust gases and spent air, and that these compounds can be recovered readily and in high yield from the adsorbents by removing them with hot air and, especially, steam.

The process of the present invention for recovering nitrobenzene, dichlorobenzene and/or trichlorobenzene from exhaust gases and spent air by adsorption on a solid adsorbent, comprises passing substantially undried exhaust gases or spent air which contain nitrobenzene, dichlorobenzene and/or trichlorobenzene through a layer of silica-containing adsorbents, adsorbing these compounds therein, and subsequently regenerating the adsorbents by removing the sorbed compounds.

The compounds to be recovered are preferably 1,2-dichlorobenzene, 1,2,4-trichlorobenzene and, in particular, nitrobenzene, and silica gel is normally employed as silica-containing compound. It must be considered surprising that the waste vapours can be humid without the adsorption of the cited compounds on the adsorbent being impaired. Only when the waste vapours have high humidity, for example more than 50%, does the concentration of nitrobenzene, dichlorobenzene and/or trichlorobenzene begin to rise on exiting from the adsorption layer. If the humidity is too high, the waste vapours can either be predried or their temperature increased in order to bring the relative humidity to the preferred range of below 50%, particularly to 25–40%.

As silica gel, it is possible to use all the commonly known representatives of this class of compounds. It is therefore possible to use, for example, non-shaped granular silica gel as well as powdered silica gel. However, it is preferred to use shaped silica gel, especially in bead form, and mechanically shaped silica gel. Particularly preferred types of silica gel are those which additionally contain e.g. 1 to 20% of metal oxides such as magnesium oxide, zirconium oxide, thorium oxide, titanium oxide and iron oxide. The best results are obtained with silica gel in bead form or mechanically shaped silica gel which contains e.g. 2 to 18%, preferably about 3%, of $Al_2O_3$. These latter types of silica gel have the great advantage in the process of this invention that they do not suffer any abrasion when regenerated with steam, whereas a certain amount of abrasion on regeneration with steam has to be reckoned with when using most other types of silica gel. Furthermore, the shaped silica gels which contain metal oxides, preferably $Al_2O_3$, have a very advantageous ratio of total adsorption to residual adsorption after regeneration, i.e. they have an excellent adsorptive capacity for the compounds to be adsorbed.

Although silica gels of large pore volume, which usually have specific surface areas of about 250 to 400 $m^2/g$, can be used in the process of the invention, silica gels of small pore volume are preferred, i.e. those having specific surface areas from 500 to 900 $m^2/g$, as these latter have a substantially greater adsorptive capacity for the compounds to be adsorbed.

Many representatives of the silica gels specified above are available commercially. Methods of obtaining them are generally known, e.g. from Ulmann's Enzyklopädie der technischen Chemie, 3rd edition (1964), Vol. 151. pp. 716–725, and from the literature cited therein.

The use of silica gel for adsorbing nitrobenzene, dichlorobenzene and/or trichlorobenzene contained in waste vapours constitutes a further object of this invention.

The process of this invention can be carried out in any apparatus employed in practice or known from the literature and which contains a means enabling gas to flow through a solid adsorbent. The simplest form of such means consists of one or more packed columns which contain the silica gel employed as adsorbent. The gas to be purified is usually passed from below through the (first) packed column and, if there are several such columns, the gas exiting at the top is passed, in sequence, in the same manner, through the other columns packed with silica gel.

To determine the residual content of compounds in the gas after its passage through the column or further columns, the gas is preferably analysed after it has passed through each column, for example with the aid of a hydrocarbon analyser (FID). An increase in the concentration of solvent in the stream of gas indicates the saturation of the adsorbent.

It is preferred to use hot water (steam) or also hot air for regenerating the silica gel adsorbent. Regeneration with hot water is preferred for silica gel types which do not suffer abrasion (see above). Regeneration with hot air can be performed when using silica gel types which are not abrasion-proof.

The compounds which are removed with steam can simply be recovered from the regenerant (water) by phase separation. Regeneration is conveniently effected by passing the steam down through each column from above. The water and the compounds are then stripped off at the bottom end.

If hot air is used as regenerant, this can also conveniently be passed down through the packed column from above. The substances exiting at the bottom are then condensed in a cooler.

Depending on the humidity of the exhaust air to be purified, it is advisable to dry the silica gel adsorbent after several cycles, but it is not necessary to remove water completely from the silica gel. At all events, drying improves the adsorptive capacity of the adsorbent.

The following Example illustrates the process of the invention, but implies no restriction to what is described therein. Parts and percentages are by weight, unless otherwise stated.

EXAMPLE

A packed column having a diameter of 40 mm and a height of 500 mm is used for the adsorption experiments. The column is packed with the respective adsorbent to a height of 400 mm. The rate of flow of the gas is 1600 liters per hour (1/h).

The adsorbents employed are:
1. Silica Gel M (available from Fluka AG). Amount of the packing: 326.5 g. Specific surface area: 500 to 800 m$^2$/g. The results are reported in Tables 1 and 2.
2. WS dry beads (available from Kali-Chemie). This silica gel is composed of 97% of $SiO_2$ and 3% of $Al_2O_3$. Amount of the packing: 320.8 g. Specific surface area: 650 m$^2$/g. The results are reported in Table 3.

For comparison purposes, two types of activated carbon are also used in the experiments:
3. Desorex F30 ®. Amount of the packing: 150 g. Specific surface area: 1250 m$^2$/g. The results are reported in Table 4.
4. Norit PK ®. Amount of the packing: 89.4 g. Specific surface area: 700 m$^2$/g. The results are reported in Table 5.

EXPERIMENTAL PROCEDURE (a) Adsorption

Exhaust air saturated with nitrobenzene is passed from below up through the column packed with the respective adsorbent. The gas exiting from the column is analysed with a hydrocarbon analyser (FID). If the concentration of $CH_4$ in the gas exiting from the packed column rises to over 40 ppm, the experiment is discontinued. However, it is observed that adsorbed nitrobenzene cannot be expelled by atmospheric moisture. Before each first treatment, the adsorbent is dried in an oven and then cooled in an exsiccator. Four cycles are carried out with each adsorbent.

(b) Regeneration

Regeneration with steam (hot water regeneration): Steam is passed down the column from above for 1 hour while simultaneously heating the external wall of the packed column with steam to prevent heat loss. The steam/nitrobenzene mixture is condensed in a cooler. Finally, air is passed down through the column from above at room temperature for 10 minutes to dry and cool the adsorbent. The adsorbent is then reused to adsorb nitrobenzene from the exhaust air.

After it has been loaded and regenerated 4 times, the adsorbent is removed from the column and dried in an exsiccator. The difference in weight between the amount of adsorbent employed and that of the regenerated adsorbent constitutes the residual content of nitrobenzene in the latter. The total amount of adsorbed nitrobenzene is calculated from the residual content of nitrobenzene in the adsorbent and the amount of condensed (recovered) nitrobenzene.

Regeneration with hot air:

Silica Gel M is used for this kind of regeneration, because it suffers a certain amount of abrasion on treatment with steam. Heating fluid is passed through the double jacket of the packed column and the contents of the column are thereby heated. Air is passed down through the column from above and the nitrobenzene exiting at the bottom is condensed in a cooler.

The further treatment of the adsorbent is as described for the regeneration with steam.

The results of the above experiments are reported in Tables 1 to 5.

TABLE 1

(Adsorbent: Silica Gel M; regeneration with steam)

| Experiment | Adsorption time (h) | Concentration of nitrobenzene (mg/m$^3$) entry | Concentration of nitrobenzene (mg/m$^3$) exit | Steam condensate (g) from regeneration | Regenerated nitrobenzene (g) | Ratio of steam to nitrobenzene recovered |
| --- | --- | --- | --- | --- | --- | --- |
| 1 | 48 | 1800 | <20 | 260 | 78 | 3.3 |
| 2 | 33 | 1800 | <20 | 320 | 66 | 4.85 |
| 3 | 28 | 1800 | <20 | 250 | 84 | 3.0 |
| 4 | 35 | 1800 | <20 | 355 | 67 | 5.3 |

Total amount of adsorbed nitrobenzene: 36.5%
Residual content of nitrobenzene in the regenerated adsorbent: 13.9%
Difference: 22.6%

TABLE 2

(Adsorbent: Silica Gel M, regeneration with hot air)

| Experiment | Adsorption time (h) | Concentration of nitrobenzene (mg/m$^3$) entry | Concentration of nitrobenzene (mg/m$^3$) exit | Regeneration: temp. in column (°C.) | Regeneration: time (h) | Carrier air (l/h) | Condensed nitrobenzene (g) | Condensed nitrobenzene total |
| --- | --- | --- | --- | --- | --- | --- | --- | --- |
| 1 | 88 | 1450 | 16.5 | 170 | 16 | — | 23.4 | — |
|   |   |   |   | 170 | 10 | 5 | 51.8 | 75.2 |
| 2 | 54 | 1720 | 16.5 | 150 | 2.5 | 50 | 65.6 | — |
|   |   |   |   | 150 | 1.0 | 150 | 14.4 | 80.0 |
| 3 | 27 | 1907 | 91.7 | 135 | 1.5 | 150 | 49.4 | 49.4 |
| 4 | 27 | 1338 | 91.7 | 145 | 1.5 | 150 | 60.2 | 60.2 |
| 5 | 37 | 1142 | 71.3 | 145 | 1.5 | 150 | 55.9 | 55.9 |

Total amount of adsorbed nitrobenzene: 36.9%
Residual content of nitrobenzene in the regenerated adsorbent: 20.6%
Difference: 16.3%

TABLE 3

(Adsorbent: WS dry beads; regeneration with steam)

| Experiment | Adsorption time (h) | Concentration of nitrobenzene (mg/m³) entry | Concentration of nitrobenzene (mg/m³) exit | Steam condensate (g) from regeneration | Regenerated nitrobenzene (g) | Ratio of steam to nitrobenzene recovered |
|---|---|---|---|---|---|---|
| 1 | 50.5 | 1800 | <20 | 227 | 75.6 | 3.0 |
| 2 | 27.5 | 1800 | <20 | 223 | 62.4 | 3.6 |
| 3 | 28 | 1800 | <20 | 219 | 67.2 | 3.26 |
| 4 | 27 | 1800 | <20 | 268 | 74.4 | 3.6 |

Total amount of adsorbed nitrobenzene: 47.5%
Residual content of nitrobenzene in the regenerated adsorbent: 25.7%
Difference: 21.8%

TABLE 4

(Adsorbent: activated carbon Desorex F30 ®; regeneration with steam)

| Experiment | Adsorption time (h) | Concentration of nitrobenzene (mg/m³) entry | Concentration of nitrobenzene (mg/m³) exit | Steam condensate (g) from regeneration | Regenerated nitrobenzene (g) | Ratio of steam to nitrobenzene recovered |
|---|---|---|---|---|---|---|
| 1 | 36 | 1800 | <20 | 400 | 32.4 | 12.3 |
| 2 | 16 | 1800 | <20 | 350 | 36.8 | 9.7 |
| 3 | 14 | 1800 | <20 | 300 | 32.4 | 9.3 |
| 4 | 14 | 1800 | <20 | 300 | 32.4 | 9.3 |

Total amount of adsorbed nitrobenzene: 68.5%
Residual content of nitrobenzene in the regenerated adsorbent: 50.2%
Difference: 18.3%

TABLE 5

(Adsorbent: activated carbon Norit PK ®; regeneration with steam)

| Experiment | Adsorption time (h) | Concentration of nitrobenzene (mg/m³) entry | Concentration of nitrobenzene (mg/m³) exit | Steam condensate (g) from regeneration | Regenerated nitrobenzene (g) | Ratio of steam to nitrobenzene recovered |
|---|---|---|---|---|---|---|
| 1 | 17 | 1800 | <20 | 305 | 24 | 12.7 |
| 2 | 8 | 1800 | <20 | 205 | 18 | 11.4 |
| 3 | 8.5 | 1800 | <20 | 96 | 9 | 10.8 |
| 4 | 4.5 | 1800 | <20 | 239 | 16 | 14.9 |

Total amount of adsorbed nitrobenzene: 48.9%
Residual content of nitrobenzene in the regenerated adsorbent: 30%
Difference: 18.9%

TABLE 6

Comparison of the different absorbents tested

| Adsorbent | Amount (g) | Specific surface area of absorbent (m²/g) | Total adsorption (%) | Residual content of nitrobenzene after regeneration (%) | Difference (%) | Ratio of steam to nitrobenzene recovered |
|---|---|---|---|---|---|---|
| activated carbon ®Desorex F 30 | 150 | 1250 | 68.5 | 50.2 | 18.3 | 10.1 |
| activated carbon ®Norit PK | 89.4 | 700 | 48.9 | 30.0 | 18.9 | 12.5 |
| Silica Gel M | 326.4 | 500–800 | 36.5 | 13.9 | 22.6 | 4.1 |
| WS dry beads | 320.8 | 650 | 47.5 | 25.7 | 21.8 | 3.4 |

It is evident from Table 6 that the silica gel adsorbent, in addition to having advantages as regards safety, also has a greater difference between the total adsorption and the residual adsorption after regeneration, i.e. a greater capacity as well as a substantially better ratio of the amount of steam used for regeneration to recovered nitrobenzene (i.e. substantially less steam is needed for regeneration), compared with known activated carbon adsorbents.

As Tables 7 to 10 show, similar results are obtained by carrying out the procedure of this Example with exhaust air containing 1,2-dichlorobenzene and 1,2,4-trichlorobenzene.

TABLE 7

1,2-dichlorobenzene (adsorbent: WS dry beads; regeneration with steam)

| Experiment | Adsorption time (h) | Concentration of 1,2-dichlorobenzene (mg/m³) entry | Concentration of 1,2-dichlorobenzene (mg/m³) exit | Steam condensate (g) from regeneration | Regenerated 1,2-dichlorobenzene (g) | Ratio of steam to 1,2-dichlorobenzene recovered |
|---|---|---|---|---|---|---|
| 1 | 5.5 | 3550 | 10 | 145 | 26 | 5.6 |
| 2 | 3.0 | 3580 | 8/27[1] | 120 | 14.3 | 10.9 |
| 3 | 3.5 | 3200 | 8/20[2] | 75 | 13.0 | 5.8 |

Total amount of adsorbed 1,2-dichlorobenzene: 10.45%
Residual content of 1,2-dichlorobenzene in regenerated adsorbent: 5%
Difference: 5.45%

[1] increasing to 340 mg/m³
[2] increasing to 290 mg/m³

TABLE 8

1,2-Dichlorobenzene (adsorbent: activated carbon Desorex F30 ®; regeneration with steam)

| Experiment | Adsorption time (h) | Concentration of 1,2-dichlorobenzene (mg/m³) entry | Concentration of 1,2-dichlorobenzene (mg/m³) exit | Steam condensate (g) from regeneration | Regenerated 1,2-dichlorobenzene (g) | Ratio of steam to 1,2-dichlorobenzene recovered |
|---|---|---|---|---|---|---|
| 1 | 26.5 | 3200 | <20 | 580 | 43 | 13.5 |
| 2 | 7 | 3200 | <20 | 460 | 37 | 12.4 |
| 3 | 8 | 3200 | <20 | 320 | 34 | 9.4 |
| 4 | 7 | 3200 | <20 | 453 | 38 | 11.9 |

Total amount of adsorbed 1,2-dichlorobenzene: 67.4%
Residual content of 1,2-dichlorobenzene in regenerated adsorbent: 47.2%
Difference: 20.2%

TABLE 9

1,2,4-Trichlorobenzene (adsorbent: WS dry beads; regeneration with steam)

| Experiment | Adsorption time (h) | Concentration of 1,2,4-trichlorobenzene (mg/m³) entry | Concentration of 1,2,4-trichlorobenzene (mg/m³) exit | Steam condensate (g) from regeneration | Regenerated 1,2,4-trichlorobenzene (g) | Ratio of steam to 1,2,4-trichlorobenzene recovered |
|---|---|---|---|---|---|---|
| 1 | 48 | 2000 | 20 | 174 | 108.5 | 1.6 |
| 2 | 26 | 2000 | 20 | 218 | 89.7 | 2.4 |
| 3 | 24 | 2000 | 20 | 214 | 88.3 | 2.2 |
| 4 | 27 | 2000 | 20 | 256 | 85.3 | 3.0 |

Total amount of adsorbed 1,2,4-trichlorobenzene: 47%
Residual content of 1,2,4-trichlorobenzene in regenerated adsorbent: 19.2%
Difference: 27.8%

TABLE 10

1,2,4-Trichlorobenzene (adsorbent: activated carbon Desorex F30 ®; regeneration with steam)

| Experiment | Adsorption time (h) | Concentration of 1,2,-4-trichlorobenzene (mg/m³) entry | exit | Steam condensate (g) from regeneration | Regenerated 1,2,4-trichlorobenzene (g) | Ratio of steam to 1,2,4-trichlorobenzene recovered |
|---|---|---|---|---|---|---|
| 1 | 72 | 1900 | 23 | 700 | 47.7 | 14.6 |
| 2 | 24 | 1900 | 20 | 210 | 33 | 6.4 |
| 3 | 18 | 1900 | 20 | 200 | 30.4 | 6.6 |
| 4 | 19 | 1900 | 20 | 212 | 27.6 | 5.4 |

Total amount of adsorbed 1,2,4-trichlorobenzene: 85%
Residual content of 1,2,4-trichlorobenzene in regenerated adsorbent: 61%
Difference: 24%

TABLE 11

Influence of humidity on the adsorption of nitrobenzene on WS dry beads. Regeneration with steam.

| Adsorption temperature (°C.) | Humidity relative (%) | Humidity absolute (g H₂O/m³) | Concentration of nitrobenzene (mg/m³) entry | exit | Total adsorption of nitrobenzene (%) | Residual nitrobenzene in regenerated adsorbent (%) | Difference (%) | Ratio of steam to nitrobenzene recovered |
|---|---|---|---|---|---|---|---|---|
| 20 | 0 | 0 | 1820 | 10 | 41.6 | 18.2 | 23.4 | 4.3 |
| 20 | 25 | 4.3 | 1933 | 10 | 42.1 | 16.6 | 25.5 | 3.7 |
| 20 | 50 | 8.7 | 2060 | 80 | 30.6 | 13.8 | 16.8 | 4.0 |
| 25 | 0 | 0 | 1785 | 5 | 37.8 | 14.5 | 23.3 | 4.3 |
| 25 | 25 | 5.8 | 2127 | 8 | 36.6 | 13.2 | 23.4 | 5.7 |
| 25 | 50 | 11.5 | 2255 | 30 | 35.4 | 14.8 | 20.6 | 5.6 |
| 30 | 0 | 0 | 2420 | 8 | 38.2 | 19.0 | 19.2 | 4.4 |
| 30 | 25 | 7.6 | 2630 | 11 | 35.4 | 14.8 | 20.6 | 5.1 |
| 30 | 40 | 12.3 | 2412 | 13 | 33.3 | 13.4 | 19.9 | 5.6 |
| 30 | 50 | 15.2 | 2690 | 43 | 31.5 | 11.2 | 20.3 | 5.9 |

What is claimed is:

1. A process for recovering nitrobenzene, dichlorobenzene or trichlorobenzene from exhaust gases or spent air, by adsorption on a solid adsorbent, which process comprises passing the substantially undried exhaust gases or spent air containing these compounds through a layer of silica-containing adsorbents, adsorbing said compounds, and subsequently regenerating the adsorbents by removing the sorbed compounds therefrom.

2. A process according to claim 1 for separating nitrobenzene from exhaust gases.

3. A process according to claim 1, wherein exhaust gases or spent air having a relative humidity of up to 50% are passed through a layer of silica-containing adsorbents.

4. A process according to claim 1, wherein the exhaust gases or spent air are passed through a layer of silica gel containing 1 to 20% by weight of a metal oxide.

5. A process according to claim 4, wherein the exhaust gases or spent air are passed through a layer of silica gel containing 2 to 18% of alumina.

6. A process according to claim 1, wherein the exhaust gases or spent air are passed through a layer of silica gel having a low pore volume and a specific surface area of at least 500 m²/g.

7. A process according to claim 1, wherein the exhaust gases or spent air are passed through a layer of silica gel beads.

8. A process according to claim 1, wherein the exhaust gases or spent air are passed through a layer of mechanically shaped silica gel.

9. A process according to claim 1, wherein the adsorbents are regenerated by removing the sorbed compounds therefrom with steam or hot air.

10. A process according to claim 9, wherein the sorbed compounds are removed with steam.

11. A process according to claim 1, wherein the exhaust gases or spent air containing nitrobenzene, dichlorobenzene or trichlorobenzene are passed from below up through one or more packed columns which contain the adsorbents.

* * * * *